US010866626B2

(12) United States Patent
Sugimoto

(10) Patent No.: US 10,866,626 B2
(45) Date of Patent: Dec. 15, 2020

(54) ELECTRONIC APPARATUS, POWER-SAVING CONTROL METHOD, AND PROGRAM

(71) Applicant: FUJIFILM Corporation, Tokyo (JP)

(72) Inventor: Masahiko Sugimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 82 days.

(21) Appl. No.: 16/373,005

(22) Filed: Apr. 2, 2019

(65) Prior Publication Data
US 2019/0227617 A1 Jul. 25, 2019

Related U.S. Application Data

(63) Continuation of application No. PCT/JP2017/031040, filed on Aug. 30, 2017.

(30) Foreign Application Priority Data

Oct. 18, 2016 (JP) .................................. 2016-204417

(51) Int. Cl.
*G06F 1/00* (2006.01)
*G06F 1/32* (2019.01)
(Continued)

(52) U.S. Cl.
CPC .......... *G06F 1/3234* (2013.01); *G03G 21/00* (2013.01); *G06F 1/32* (2013.01); *G06F 1/3209* (2013.01);
(Continued)

(58) Field of Classification Search
CPC ........ G06F 1/32; G06F 1/3209; G06F 1/3215; G06F 1/3231; G06F 1/3234
See application file for complete search history.

(56) References Cited

U.S. PATENT DOCUMENTS

2002/0174371 A1* 11/2002 Padawer ............... G06F 1/3203
713/320
2006/0053315 A1* 3/2006 Menzl ................ H04N 1/00928
713/300
2007/0294554 A1* 12/2007 Kim ...................... G06F 1/3203
713/323

FOREIGN PATENT DOCUMENTS

JP      10-173970 A     6/1998
JP      11-95626 A      4/1999
(Continued)

OTHER PUBLICATIONS

International Preliminary Report on Patentability and Written Opinion of the International Searching Authority (forms PCT/IPEA/409 and PCT/ISA/237), dated May 28, 2018, for corresponding International Application No. PCT/JP2017/031040, with International Preliminary Report on Patentability translation.

(Continued)

*Primary Examiner* — Nitin C Patel
(74) *Attorney, Agent, or Firm* — Birch, Stewart, Kolasch & Birch, LLP

(57) ABSTRACT

Provided are an electronic apparatus, a power-saving control method, and a program capable of realizing both ease of use for a user and power-saving. A determination unit that determines whether a non-operation state of a user continues for a reference time in a first power mode, a mode control unit that shifts a power mode to a second power mode in which power is saved in a case where determination is made that the non-operation state continues for the reference time in the first power mode, a time interval detection unit that detects a time interval from the shift to the second power mode to an operation by the user, and a time control unit that changes the reference time based on the detected time interval are provided.

20 Claims, 12 Drawing Sheets

(51) Int. Cl.
  *G06F 1/3234* (2019.01)
  *G06F 9/30* (2018.01)
  *H04N 5/232* (2006.01)
  *G06T 7/73* (2017.01)
  *G06K 9/32* (2006.01)
  *G06F 3/01* (2006.01)
  *G06F 1/3209* (2019.01)
  *G06F 1/3215* (2019.01)
  *G03G 21/00* (2006.01)
  *G06F 1/3231* (2019.01)
  *G06K 9/00* (2006.01)

(52) U.S. Cl.
  CPC .......... *G06F 1/3215* (2013.01); *G06F 1/3231* (2013.01); *G06F 3/013* (2013.01); *G06F 9/3004* (2013.01); *G06K 9/00281* (2013.01); *G06K 9/3241* (2013.01); *G06T 7/73* (2017.01); *H04N 5/232* (2013.01); *H04N 5/23254* (2013.01)

(56) References Cited

FOREIGN PATENT DOCUMENTS

| JP | 2001-339627 A | 12/2001 |
| JP | 2004-101919 A | 4/2004 |
| JP | 2007-226524 A | 9/2007 |
| JP | 2011-22767 A | 2/2011 |
| JP | 2015-66780 A | 4/2015 |
| WO | 2016/006078 A1 | 1/2016 |

OTHER PUBLICATIONS

International Search Report (form PCT/ISA/210), dated Dec. 5, 2017, for corresponding International Application No. PCT/JP2017/031040, with an English translation.

* cited by examiner

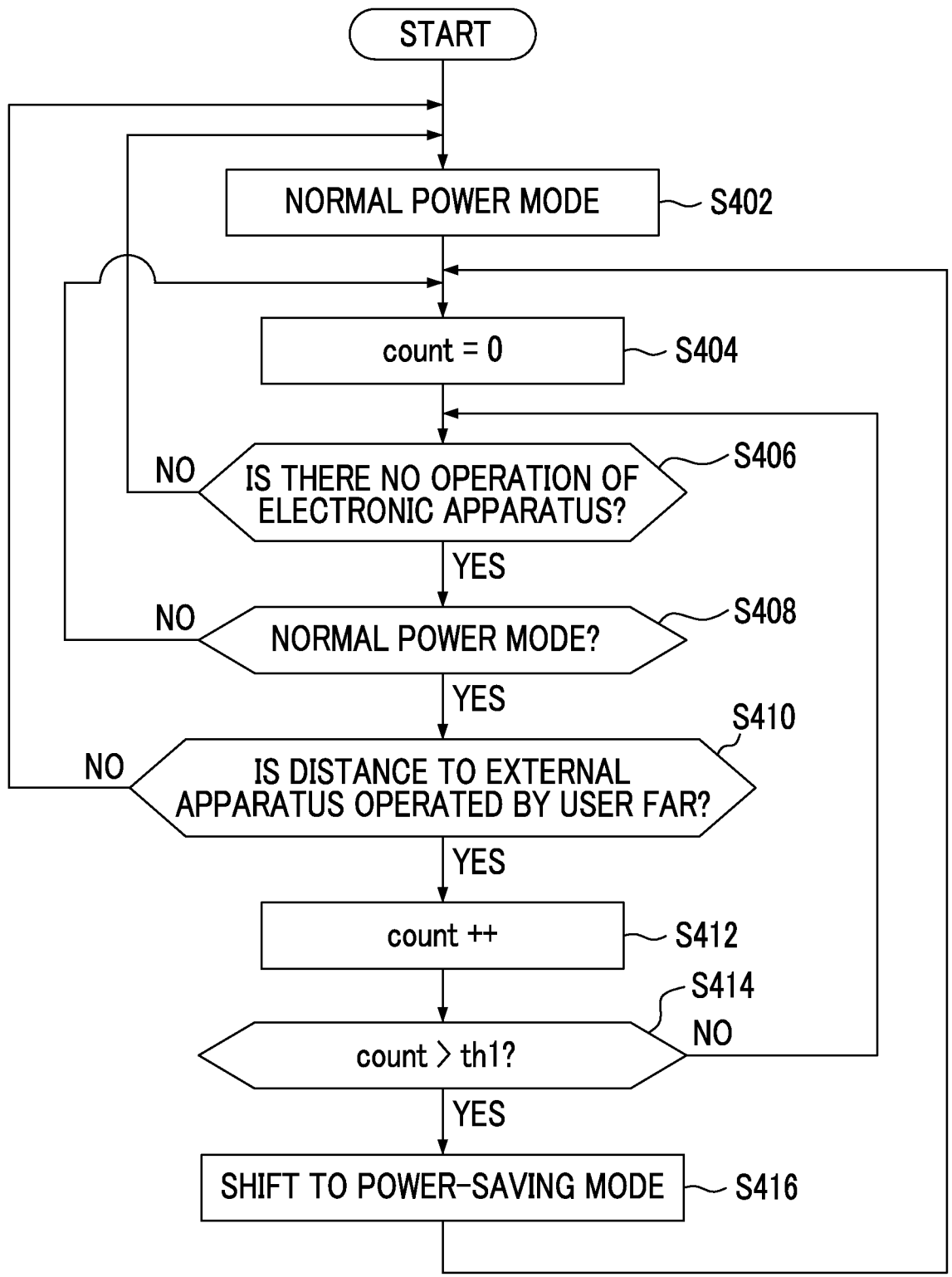

ELECTRONIC APPARATUS, POWER-SAVING CONTROL METHOD, AND PROGRAM

CROSS-REFERENCE TO RELATED APPLICATIONS

This application is a Continuation of PCT International Application No. PCT/JP2017/031040 filed on Aug. 30, 2017, which claims priority under 35 U.S.C § 119(a) to Japanese Patent Application No. 2016-204417 filed on Oct. 18, 2016. Each of the above application(s) is hereby expressly incorporated by reference, in its entirety, into the present application.

BACKGROUND OF THE INVENTION

1. Field of the Invention

The present invention relates to an electronic apparatus, a power-saving control method, and a program that realize both ease of use for a user and power-saving.

2. Description of the Related Art

In the related art, there is a product having a normal power mode and a power mode (hereinafter referred to as "power-saving mode") suppressing power consumption compared with the normal power mode in an electronic apparatus. For example, in a case where there is no operation by a user continuously for a certain period of time, the power mode shifts from the normal power mode to the power-saving mode. The "power-saving mode" is referred to as "energy-saving mode", "low power mode", or the like. Further, there is a case where the "power-saving mode" is also referred to as "sleep mode", "hibernation mode", or the like depending on a limitation form of power supply, a saving form of memory contents, or the like.

Further, there is a known technique of automatically changing a switching time to the power-saving mode after the electronic apparatus is not used in the normal power mode.

JP2004-101919A and JP1999-095626A (JP-H11-095626A) disclose that the number of print times in the past (number of uses) is stored for each time zone, a shift time from a standby mode (standby state) to the power-saving mode is set short in a time zone in which the number of print times is small, and the shift time from the standby mode to the power-saving mode is set long in a time zone in which the number of print times is large in image forming apparatuses.

SUMMARY OF THE INVENTION

In the electronic apparatus operated by the user, an appropriate length of the switching time to the power-saving mode after the electronic apparatus is not used in the normal power mode (hereinafter referred to as "shift time") is largely different depending on an operation situation of the user.

A setting input of the time may be received from the user, but it is complicated for the user to frequently set the time and the user may not perform the setting input of the appropriate length of the time.

In the techniques disclosed in JP2004-101919A and JP1999-095626A (JP-H11-095626A), the shift time is changed only based on the number of uses in the past time for each time zone. Therefore, there may be a case where the shift time is short or long with respect to the operation situation of the user.

A purpose of the invention is to provide an electronic apparatus, a power-saving control method, and a program capable of realizing both ease of use for the user and power-saving.

In order to achieve the purpose described above, an electronic apparatus according to a first aspect of the invention comprises an operation unit operated by a user, a determination unit that determines whether a non-operation state of the user continues for a reference time in a first power mode, a mode control unit that shifts the power mode from the first power mode to a second power mode in which power is saved compared with the first power mode in a case where determination is made that the non-operation state continues for the reference time in the first power mode, a time interval detection unit that detects a time interval from the shift to the second power mode to the operation of the operation unit by the user, and a time control unit that changes the reference time used in the case where the first power mode is shifted to the second power mode based on the time interval detected in the second power mode.

According to the aspect, since the reference time used in the case where the power mode is shifted to the second power mode is changed based on the time interval from the shift to the second power mode in which the power is saved to the operation of the operation unit by the user, the time until the power mode shifts to the second power mode is appropriately adjusted according to an operation situation of the user to realize both ease of use for the user and the power-saving.

In the electronic apparatus according to a second aspect of the invention, the time control unit determines whether the time interval detected in the second power mode is longer or shorter than a predetermined threshold value and lengthens the reference time in a case where determination is made that the time interval is shorter than the predetermined threshold value. The "predetermined threshold value" in the aspect is not limited to a case of a fixed threshold value and may be a variable threshold value.

In the electronic apparatus according to a third aspect of the invention, the time control unit determines whether the time interval detected in the second power mode is longer or shorter than the predetermined threshold value and shortens the reference time in a case where determination is made that the time interval is longer than the predetermined threshold value. The "predetermined threshold value" in the aspect is not limited to a case of a fixed threshold value and may be a variable threshold value.

The electronic apparatus according to a fourth aspect of the invention comprises a motion analysis unit that calculates a variation amount in a direction of motion of the electronic apparatus within a certain period of time, and the determination unit determines whether the user is in the non-operation state based on the variation amount calculated by the motion analysis unit.

The electronic apparatus according to a fifth aspect of the invention comprises a camera shake determination unit determines whether the motion of the electronic apparatus includes a motion of a camera shake by the user, and the mode control unit maintains the first power mode in a case where determination is made that the motion of the electronic apparatus includes the motion of the camera shake.

The electronic apparatus according to a sixth aspect of the invention comprises an eye detection unit that detects an eye of the user, and the mode control unit maintains the first power mode in a case where the eye of the user is detected.

The electronic apparatus according to a seventh aspect of the invention comprises an imaging unit that images an object and an imaging estimation unit that estimates whether the imaging starts, and the mode control unit maintains the first power mode in a case where the imaging is estimated to be started.

In the electronic apparatus according to an eighth aspect of the invention, the mode control unit maintains the first power mode in a case where a specific operation set in advance is performed with respect to the operation unit.

An electronic apparatus according to a ninth aspect of the invention comprises a communication unit that communicates with an external apparatus operated by a user, a first determination unit that determines whether the electronic apparatus is far from or near the external apparatus based on the communication with the external apparatus, a second determination unit that determines whether a state far from the external apparatus continues for a reference time in the first power mode, and a mode control unit that shifts the power mode from the first power mode to a second power mode in which power is saved compared with the first power mode in a case where determination is made that the state far from the external apparatus continues for the reference time in the first power mode.

In the electronic apparatus according to a tenth aspect of the invention, the communication unit performs short-range communication with the external apparatus, and the first determination unit determines whether the electronic apparatus is far from or near the external apparatus based on whether the short-range communication is performed.

In the electronic apparatus according to an eleventh aspect of the invention, the first determination unit acquires distance information indicating a distance to the external apparatus and determines whether the electronic apparatus is far from or near the external apparatus based on the distance information.

In the electronic apparatus according to a twelfth aspect of the invention, the second power mode includes at least any state of a non-display state, a sleep state, a hibernation state, or an auto power-off state.

A power-saving control method according to a thirteenth aspect of the invention includes a step of determining whether a non-operation state of the user continues for a reference time in a first power mode, a step of shifting the power mode from the first power mode to a second power mode in which power is saved compared with the first power mode in a case where determination is made that the non-operation state continues for the reference time in the first power mode, a step of detecting a time interval from the shift to the second power mode to an operation of an operation unit by the user, and a step of changing the reference time used in the case where the first power mode is shifted to the second power mode based on the time interval detected in the second power mode.

A power-saving control method according to a fourteenth aspect of the invention includes a step of determining whether the electronic apparatus is far from or near an external apparatus based on communication with the external apparatus operated by a user, a step of determining whether a state far from the external apparatus continues for a reference time in the first power mode, and a step of shifting the power mode from the first power mode to a second power mode in which power is saved compared with the first power mode in a case where determination is made that the state far from the external apparatus continues for the reference time in the first power mode.

A program according to a fifteenth aspect of the invention causing a computer to execute a step of determining whether a non-operation state of the user continues for a reference time in a first power mode, a step of shifting the power mode from the first power mode to a second power mode in which power is saved compared with the first power mode in a case where determination is made that the non-operation state continues for the reference time in the first power mode, a step of detecting a time interval from the shift to the second power mode to an operation of an operation unit by the user, and a step of changing the reference time used in the case where the first power mode is shifted to the second power mode based on the time interval detected in the second power mode.

A program according to a sixteenth aspect of the invention causing a computer to execute a step of determining whether the electronic apparatus is far from or near an external apparatus based on communication with the external apparatus operated by a user, a step of determining whether a state far from the external apparatus continues for a reference time in the first power mode, and a step of shifting the power mode from the first power mode to a second power mode in which power is saved compared with the first power mode in a case where determination is made that the state far from the external apparatus continues for the reference time in the first power mode.

According to the invention, it is possible to realize both ease of use for the user and power-saving.

BRIEF DESCRIPTION OF THE DRAWINGS

FIG. 13 is a flowchart showing a flow of an example of power-saving control processing in the fourth embodiment.

DESCRIPTION OF THE PREFERRED EMBODIMENTS

Hereinafter, embodiments for implementing an electronic apparatus, a power-saving control method, and a program will be described according to accompanying drawings.

Examples of the electronic apparatus in the invention are a digital camera, a smartphone, and the like. The examples may be other electronic apparatuses.

First Embodiment

Figure 1:
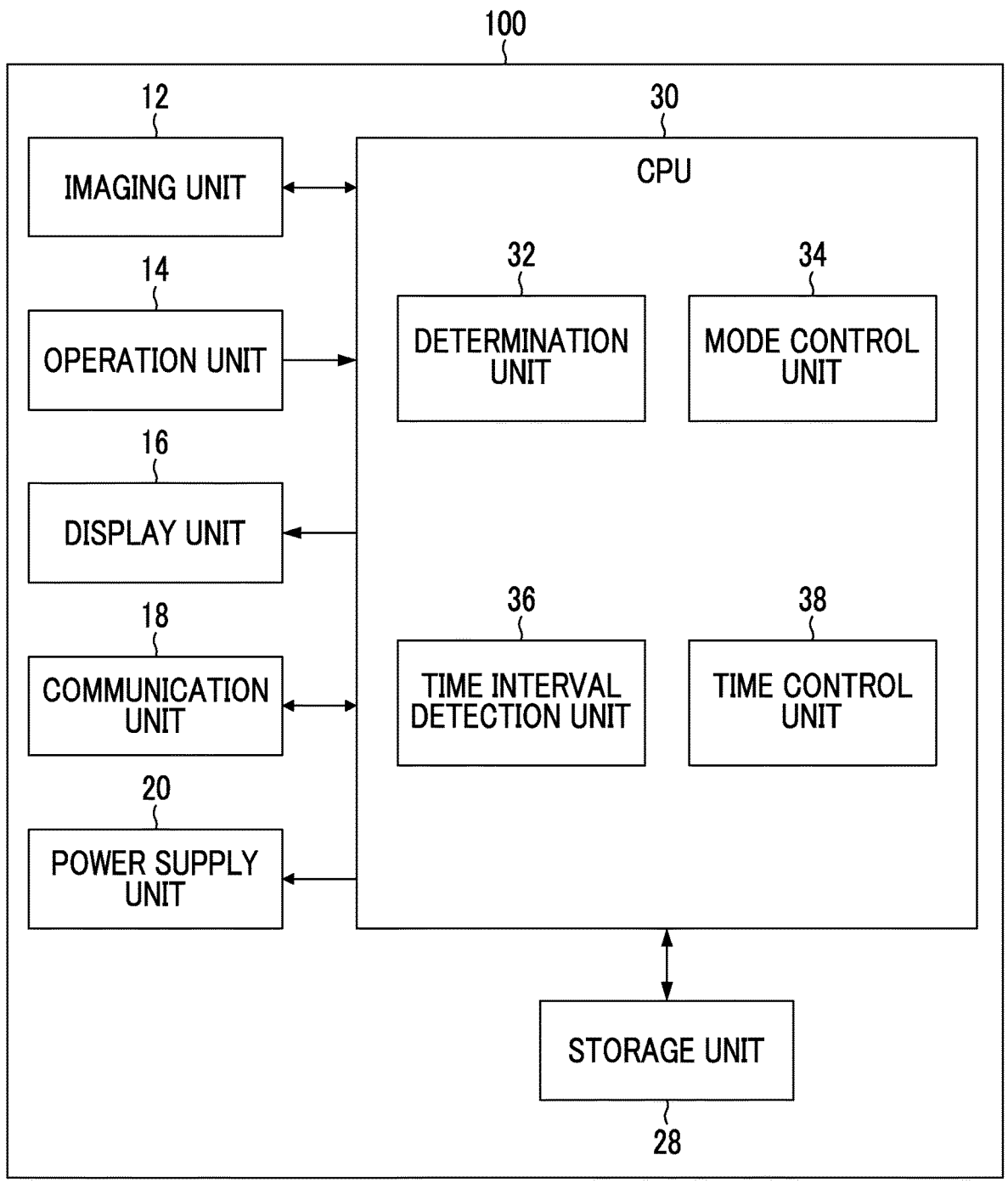
FIG. 1 is a block diagram showing a configuration example of an electronic apparatus of a first embodiment.

FIG. 1 is a block diagram showing a configuration example of an electronic apparatus 100 of a first embodiment.

The electronic apparatus 100 of the example is configured by including an imaging unit 12 that images an object, an operation unit 14 that operated by s user, a display unit 16 that can display an image, a communication unit 18 that communicates with an external apparatus, a power supply unit 20 that supplies the power to each unit of the electronic apparatus 100, a storage unit 28 that stores a program and information required for executing the program, and a central processing unit (CPU) 30 that executes the program.

The imaging unit 12 is configured by including an imaging optical system and an imaging element. The imaging unit 12 images the object under the control of the CPU 30.

The operation unit 14 may be configured of, for example, a touch panel. A keyboard or a mouse may be used or other user interfaces may also be employed.

The display unit 16 is configured of a display device such as a liquid crystal display device.

The communication unit 18 is configured of a communication device that performs wireless communication or wire communication.

The power supply unit 20 switches between a normal power mode (first power mode) and a power-saving mode (second power mode) in which the power is saved compared with the normal power mode under the control of the CPU 30.

In the example, the "power-saving mode" includes at least any of a non-display state, a sleep state, a hibernation state, or an auto power-off state. However, the "power-saving mode" in the embodiment is not limited to the states described above but may be more power-saving than the normal power mode.

The storage unit 28 is configured of a non-transitory storage device such as a random access memory (RAM) and a transitory storage device such as a read only memory (ROM) and an electrically erasable programmable read only memory (EEPROM). The program is stored in the non-transitory storage device. The program may be stored in other non-transitory storage devices.

The CPU 30 comprises a determination unit 32 that determines whether a non-operation state of the user continues for a reference time in the normal power mode (first power mode), a mode control unit 34 that shifts the power mode from the normal power mode to the power-saving mode (second power mode) in which the power is saved compared with the normal power mode in a case where the determination unit 32 determines that the non-operation state continues for the reference time in the normal power mode, a time interval detection unit 36 that detects a time interval (non-operation time of power-saving mode) from the shift to the power-saving mode by the mode control unit 34 to the operation by the user, and a time control unit 38 that changes the reference time used in the case where the normal power mode is shifted to the power-saving mode based on the time interval (non-operation time of power-saving mode) detected by the time interval detection unit 36 in the power-saving mode.

Figure 2:
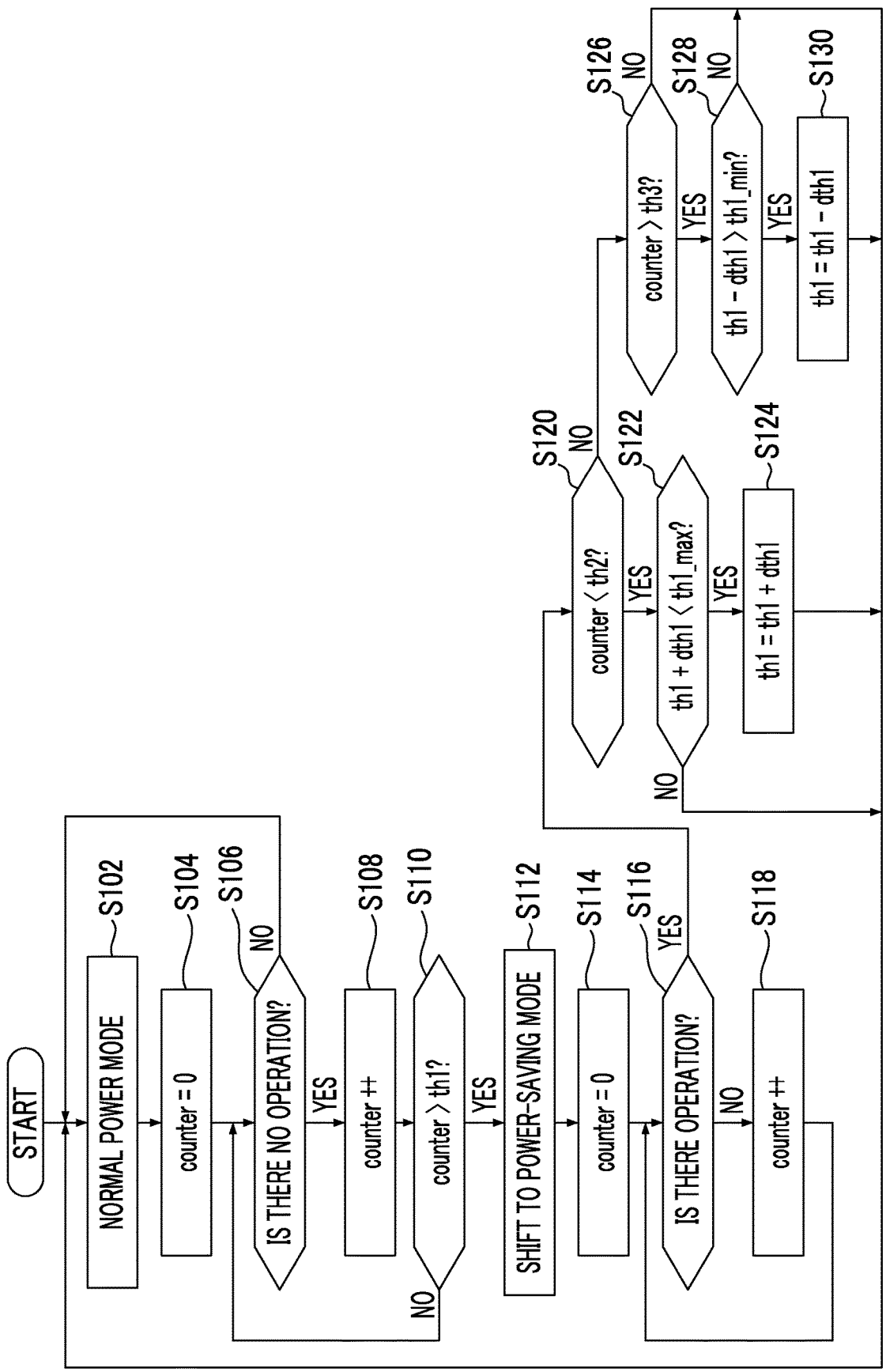
FIG. 2 is a flowchart showing a flow of an example of power-saving control processing in the first embodiment.

FIG. 2 is a flowchart showing a flow of an example of power-saving control processing in the first embodiment in which the power-saving control method of the invention is employed. The processing is executed by the CPU 30 (which is one form of computer) according to the program stored in the storage unit 28.

First, the mode control unit 34 sets the power supply unit 20 to the normal power mode (step S102), and the time interval detection unit 36 resets a value of a counter for counting the non-operation time to zero (step S104).

In the normal power mode, the determination unit 32 determines the presence or absence of the user operation (step S106). In the example, the determination unit 32 determines the presence or absence of the user operation with respect to the operation unit 14. In a case where it is determined that there is no operation in the normal power mode (YES in step S106), the time interval detection unit 36 updates the value of the counter (step S108) and the determination unit 32 determines whether the value of the counter exceeds a first threshold value th1 (step S110). That is, the determination unit 32 determines whether the non-operation state of the user continues for the reference time in the normal power mode.

In normal power mode, in a case where the value of the counter exceeds the first threshold value th1 (YES in step S110), the mode control unit 34 sets the power supply unit 20 to the power-saving mode (step S112) and the time interval detection unit 36 resets the value of the counter for counting the non-operation time to zero (step S114). That is, in the case where it is determined that the non-operation state of the user continues for the reference time in the normal power mode, the mode control unit 34 shifts the power mode from the normal power mode to the power-saving mode.

In the power-saving mode, the determination unit 32 determines the presence or absence of the user operation (step S116). In the example, the determination unit 32 determines the presence or absence of the user operation with respect to the operation unit 14. In a case where it is determined that there is no operation in the power-saving mode (NO in step S116), the time interval detection unit 36 updates the value of the counter (step S118). The value of the counter is continuously updated until it is determined that there is an operation in the power-saving mode (that is, until it is determined as YES in step S116).

In a case where it is determined that there is an operation in the power-saving mode (YES in step S116), the time interval detection unit 36 changes the first threshold value th1 (reference time) used in the case where the normal power mode is shifted to the power-saving mode based on the non-operation time in the power-saving mode counted by using the counter.

In the example, in a case where it is determined whether the value of the counter is less than a second threshold value th2 (step S120) and the value of the counter is less than the second threshold value th2 (YES in step S120), it is determined whether a value (th1+dth1) obtained by adding a constant value dth1 to the first threshold value th1 is within an allowable range (less than th1_max) (step S122). In a case where the value is within the allowable range, the first threshold value th1 is changed to the above-described value (th1+dth1) obtained by adding the constant value dth1 to the first threshold value th1 (step S124). Further, in the example, in a case where the value of the counter is equal to or larger than the second threshold value th2 (NO in step S120), it is determined whether the value of the counter exceeds a third threshold value th3 (step S126). In a case where the value of the counter exceeds the third threshold value th3 (YES in step S126), it is further determined whether a value (th1−dth1) obtained by subtracting the constant value dth1 from the first threshold value th1 is within an allowable range (larger than th1_min) (step S128). In a case where the value of the counter is within the allowable range, the first threshold value th1 is changed to the above-described value (th1−dth1) obtained by subtracting the constant value dth1 from the first threshold value th1.

The first threshold value th1 is variable. The second threshold value th2 is, for example, 15 seconds. The third threshold value th3 is, for example, one minute. The threshold values th1_min and th1_max indicating the allowable range are respectively, for example, 30 seconds and 10 minutes. The constant value dth1 is, for example, 15 seconds. However, these numerical values are not particularly limited and can be set as appropriate. The second threshold value th2, the third threshold value th3, and the threshold values th1_min and th1_max indicating the allowable range may be variable.

In steps S120 to S130, the time control unit 38 in the example determines whether the non-operation time detected in the power-saving mode is longer or shorter than a predetermined threshold value (at least second threshold value th2 and third threshold value th3). The first threshold value th1 is increased in a case where it is determined that the non-operation time of the power-saving mode is short, and the first threshold value th1 is decreased in a case where it is determined that the non-operation time of the power-saving mode is long.

That is, the time control unit 38 in the example increases the first threshold value th1 to lengthen the reference time in a case where it is determined that the time interval from the shift to the power-saving mode to the operation by the user is short. Further, the time control unit 38 in the example decreases the first threshold value th1 to shorten the reference time in a case where it is determined that the time interval from the shift to the power-saving mode to the operation by the user is long.

<Variation of First Embodiment>

The case where the presence or absence of the user operation with respect to the operation unit 14 is determined is described in the above description, but the invention is not limited to such a case.

The "operation" in the invention is not limited to the operation (for example, touch to touch panel) with respect to the operation unit 14 and includes action corresponding to the operation with respect to a part or the whole of the electronic apparatus 100.

Hereinafter, various types of variations in which the action of the user corresponding to the operation is detected and not only the case where there is the user operation with respect to the operation unit 14 but also the case where the action of the user corresponding to the operation is detected is determined as an operation state will be described.

Figure 3:
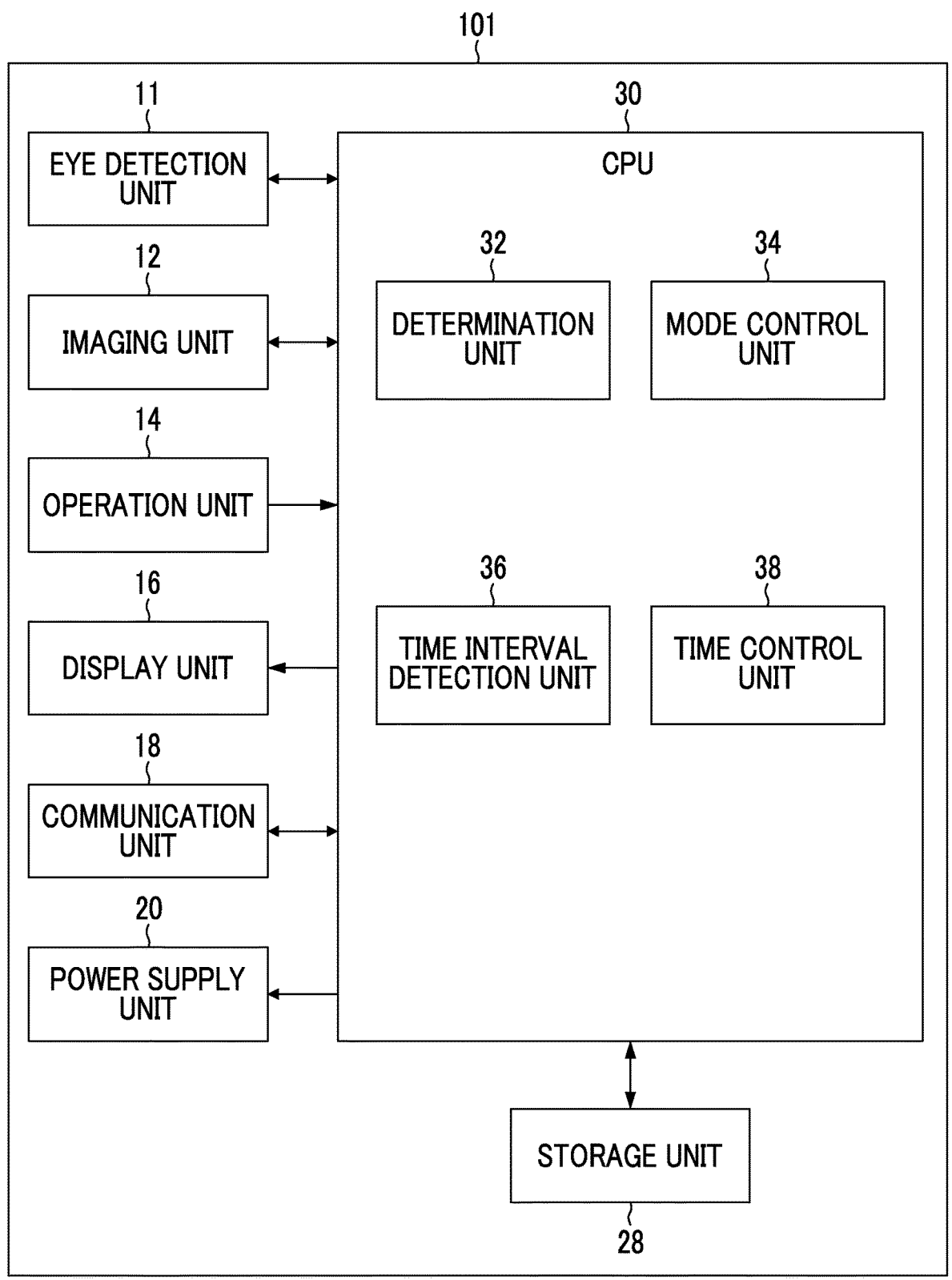
FIG. 3 is a block diagram showing a configuration example of an electronic apparatus of a first variation in the first embodiment.

FIG. 3 is a block diagram showing a configuration example of an electronic apparatus 101 of a first variation in the first embodiment. The same reference numeral is assigned to the same configuration element as that of the electronic apparatus 100 shown in FIG. 1, and the contents already described are omitted below.

The electronic apparatus 101 of the example comprises an eye detection unit 11 that detects the eye of the user. The eye detection unit 11 is configured of, for example, a known sensor.

In the electronic apparatus 101 of the example, a viewfinder is added to the imaging unit 12, and the eye detection unit 11 detects whether the user views through the viewfinder. In the determination unit 32 of the example, in a case where the eye detection unit 11 detects that the user views through the viewfinder, it is determined that the user performs the action corresponding to the operation.

That is, in the mode control unit 34 of the example, in a case where the eye detection unit 11 detects the eye of the user, the normal power mode is maintained and the shift to the power-saving mode is not executed.

Figure 4:
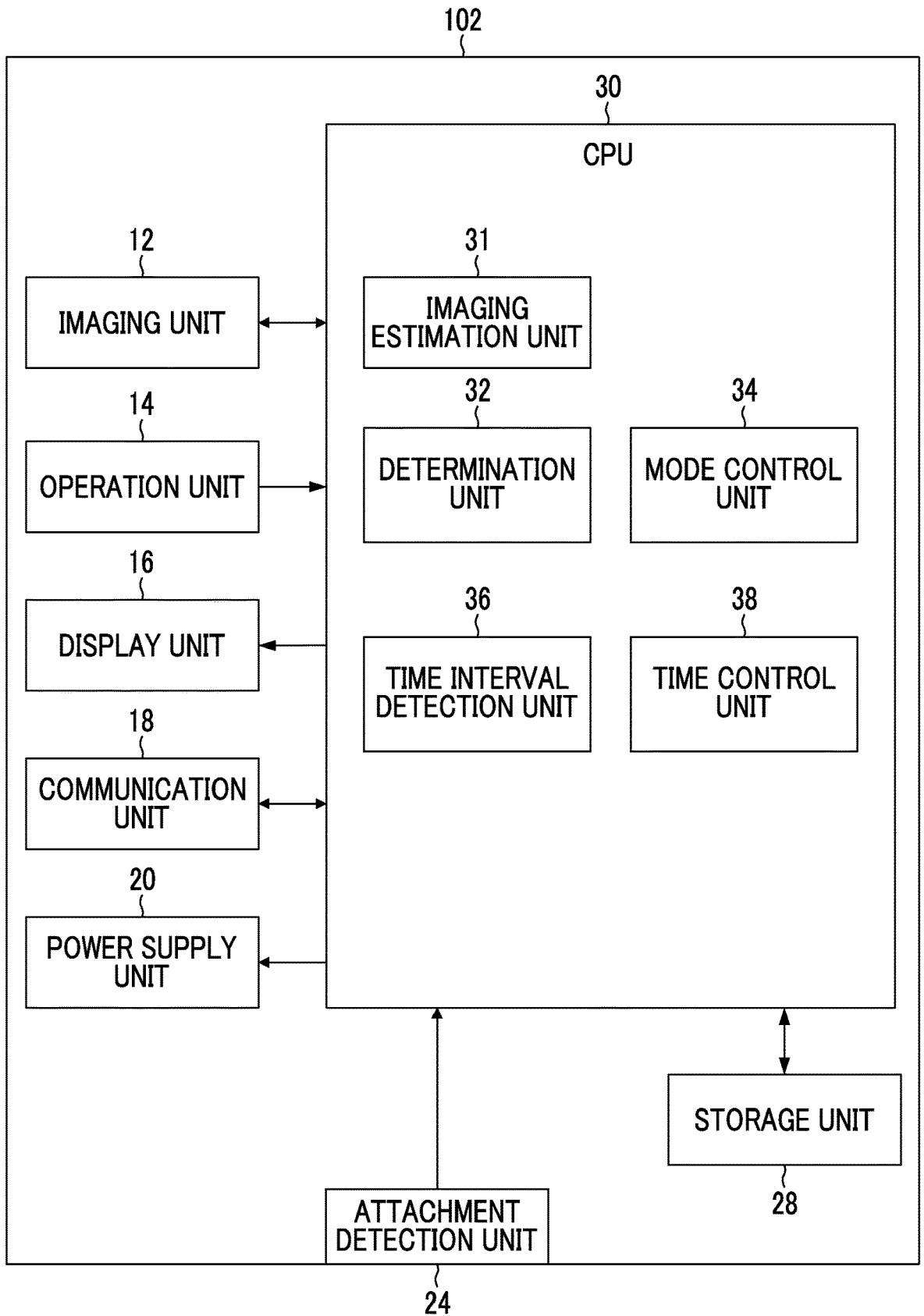
FIG. 4 is a block diagram showing a configuration example of an electronic apparatus of a second variation in the first embodiment.

FIG. 4 is a block diagram showing a configuration example of an electronic apparatus 102 of a second variation in the first embodiment. The same reference numeral is assigned to the same configuration element as that of the electronic apparatus 100 shown in FIG. 1, and the contents already described are omitted below.

The electronic apparatus 102 of the example comprises an attachment detection unit 24 that detects whether a support member (for example, tripod) for imaging is attached to the electronic apparatus 102 and an imaging estimation unit 31 that estimates whether the imaging unit 12 starts the imaging based on a detection result of the attachment detection unit 24. The imaging estimation unit 31 estimates that the imaging starts in a case where the attachment detection unit 24 detects that the support member for imaging is attached to the electronic apparatus 102. The attachment detection unit 24 is configured of, for example, a switch.

In the mode control unit 34 of the example, in the case where the imaging estimation unit 31 estimates that the imaging starts, the normal power mode is maintained and the shift to the power-saving mode is not executed.

Next, a third variation in the first embodiment will be described.

The determination unit 32 of the example determines whether a specific operation set in advance is performed with respect to the operation unit 14.

In the mode control unit 34 of the example, in a case where the specific operation set in advance is performed with respect to the operation unit 14, the normal power mode is maintained and the shift to the power-saving mode is not executed. For example, in a case where a setting operation of a self-imaging mode is performed, the shift to the power-saving mode is not executed.

Second Embodiment

Figure 5:
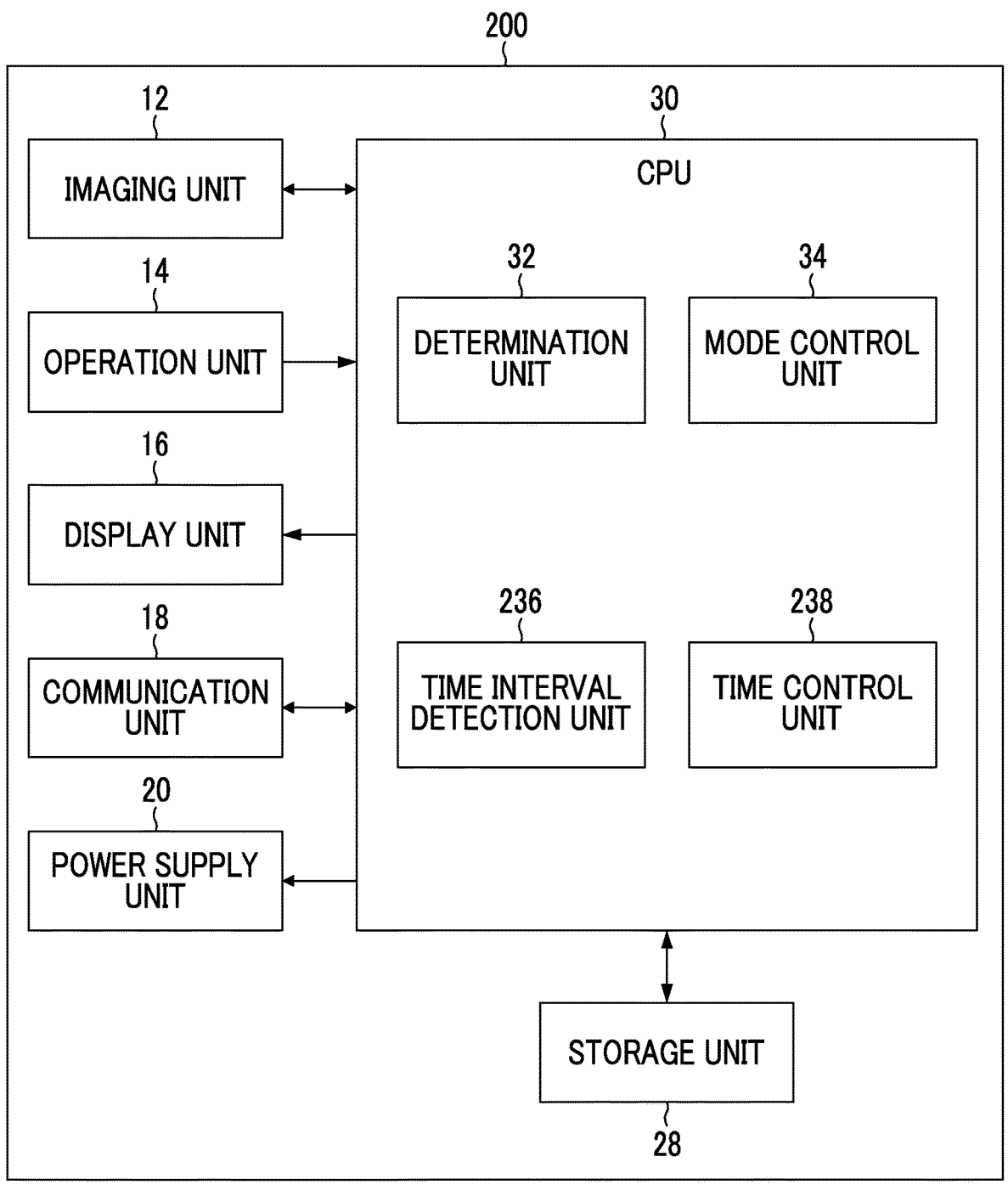
FIG. 5 is a block diagram showing a configuration example of an electronic apparatus of a second embodiment.

FIG. 5 is a block diagram showing a configuration example of an electronic apparatus 200 of a second embodiment. The same reference numeral is assigned to the same configuration element as that of the electronic apparatus 100 in the first embodiment shown in FIG. 1, and the contents already described are omitted below.

The electronic apparatus 200 of the example comprises the determination unit 32 that determines whether the non-operation state of the user continues for the reference time in the normal power mode (first power mode), the mode control unit 34 that shifts the power mode from the normal power mode to the power-saving mode (second power mode) in which the power is saved compared with the normal power mode in the case where the determination unit 32 determines that the non-operation state continues for the reference time in the normal power mode, a time interval detection unit 236 that detects a maximum value (hereinafter referred to as "maximum time interval") of an operation time interval by the user, and a time control unit 238 that changes the reference time used in the case where the normal power mode is shifted to the power-saving mode based on the detected maximum time interval.

Figure 6:
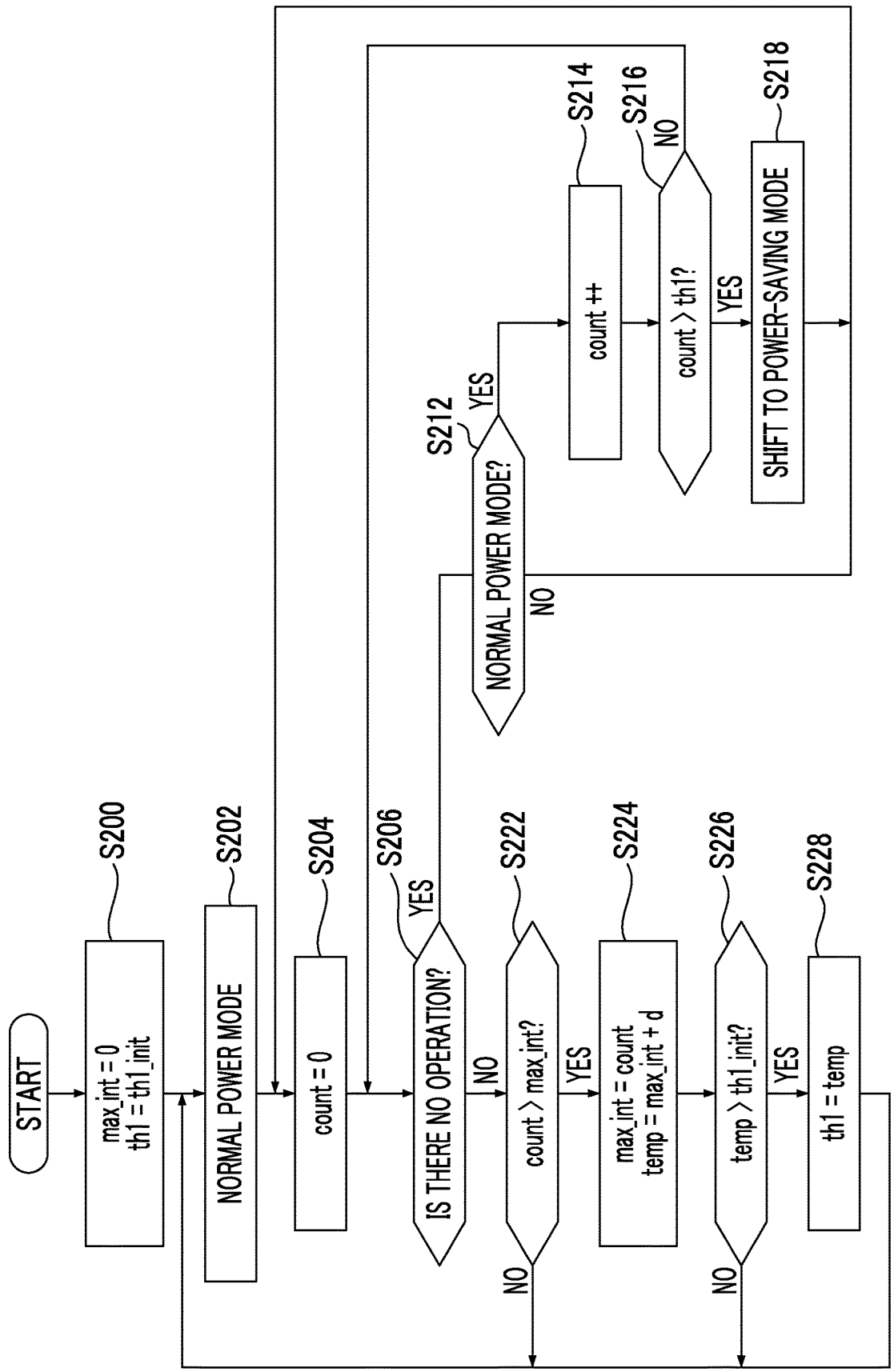
FIG. 6 is a flowchart showing a flow of an example of power-saving control processing in the second embodiment.

FIG. 6 is a flowchart showing a flow of an example of power-saving control processing in the second embodiment. The processing is executed by the CPU 30 (which is one form of computer) according to the program stored in the storage unit 28.

First, the time interval detection unit 236 resets the maximum value max_int of the operation time interval by the user to zero and sets a threshold value th1 indicating the reference time to an initial threshold value th1_init (step S200). Further, the mode control unit 34 sets the power supply unit 20 to the normal power mode (step S202), and the time interval detection unit 236 resets the value of the counter for counting the non-operation time to zero (step S204).

In the normal power mode, the determination unit 32 determines the presence or absence of the user operation (step S206).

In a case where determination is made that there is no operation (YES in step S206), steps S212 to S218 are executed. In a case where it is determined whether the power mode is the normal power mode (step S212) and the power mode is the normal power mode (YES in step S212), the value of the counter is updated (step S214) and it is determined whether the value of the counter exceeds the threshold value th1 (step S216). That is, the determination unit 32 determines whether the non-operation state of the user continues for the reference time in the normal power mode (first power mode). In a case where the value of the counter exceeds the threshold value th1 (YES in step S216), that is, it is determined that the non-operation state continues for the reference time in the normal power mode, the mode control unit 34 shifts the power mode from the normal power mode (first power mode) to the power-saving mode (second power mode) (step S218). In this case, the time interval detection unit 236 resets the value of the counter to zero (step S204), and the processing returns to step S206. In a case where the value of the counter is equal to or less than the threshold value th1 (NO in step S216), the normal power mode is maintained and the processing returns to step S206.

In a case where it is determined that there is an operation (NO in step S206), steps S222 and S224 are executed. In a case where it is determined whether the value of the counter indicating the non-operation time in the normal power mode exceeds a maximum time interval max_int (step S222) and the value of the counter exceeds the maximum time interval max_int (YES in step S222), the maximum time interval max_int is updated by the value of the counter (step S224). That is, the time interval detection unit 236 detects the maximum time interval by the user in the normal power mode. Further, in a case where it is determined whether a value temp (=max_int+d) obtained by adding a constant value d to the maximum time interval max_int is larger than the initial threshold value th1_init (step S226) and the value temp is larger than the initial threshold value th1_init (YES in step S226), the threshold value th1 is updated to the value temp obtained by adding a constant value d to the maximum time interval max_int (step S228). That is, the time control unit 238 changes the threshold value th1. The processing returns to step S202, and the mode control unit 34 sets the power supply unit 20 to the normal power mode.

In the example, in step S228, the constant value d is added to the maximum time interval max_int to calculate the threshold value th1 (reference time), but the maximum time interval max_int may be multiplied by a coefficient value to calculate the threshold value th1 (reference time).

According to the embodiment, since the reference time used in the case where the normal power mode is shifted to the power-saving mode is changed based on the maximum time interval which is the maximum value of the operation time interval by the user, a power-saving control according to the operation characteristics of the user is possible.

Third Embodiment

Figure 7:
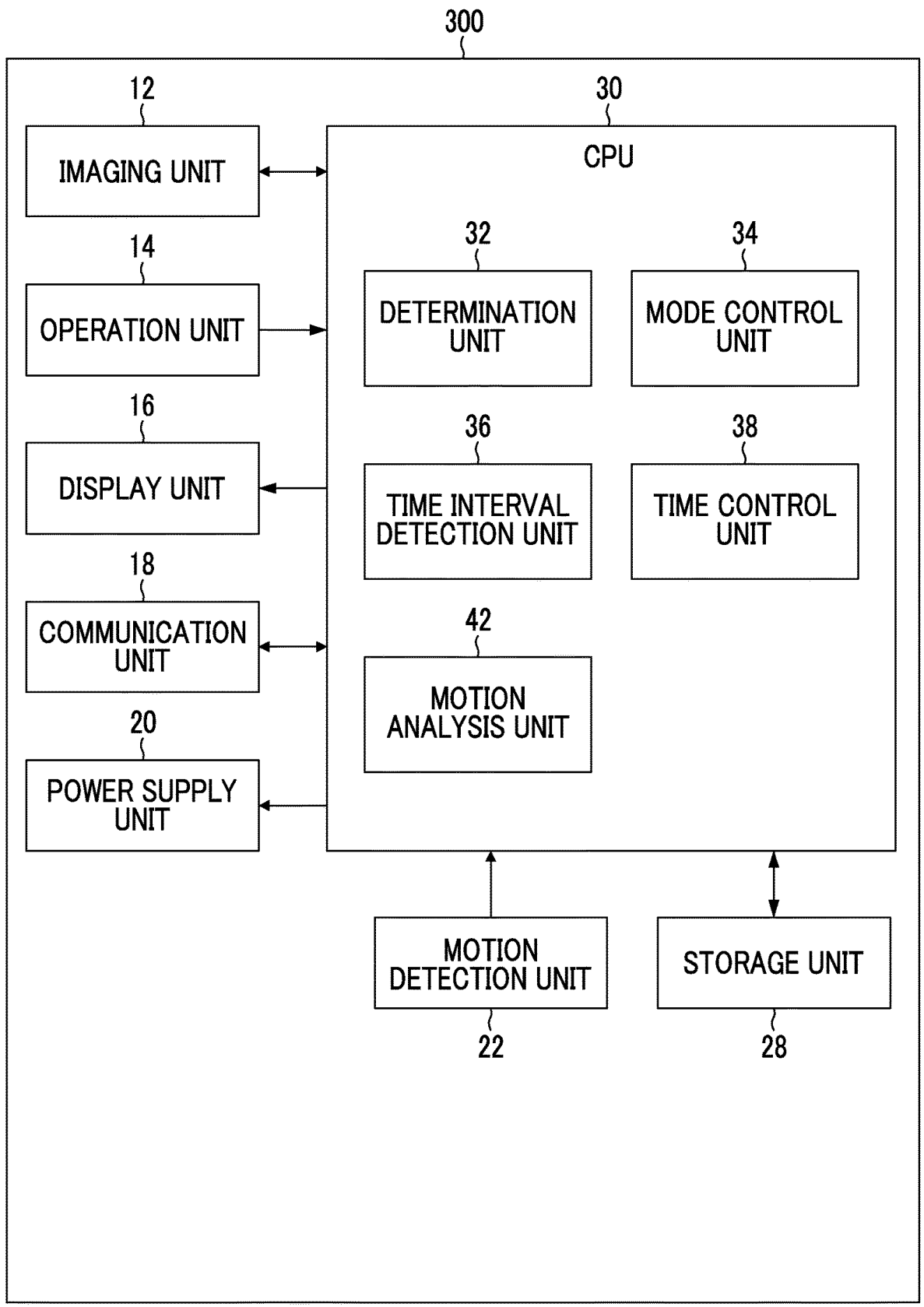
FIG. 7 is a block diagram showing a configuration example of an electronic apparatus of a third embodiment.

FIG. 7 is a block diagram showing a configuration example of an electronic apparatus 300 of a third embodiment. The same reference numeral is assigned to the same configuration element as that of the electronic apparatus 100 in the first embodiment shown in FIG. 1, and the contents already described are omitted below.

The electronic apparatus 300 of the embodiment comprises a motion detection unit 22 that detects motion of the electronic apparatus 300. The motion detection unit 22 of the example is configured of a gyro sensor (angular velocity sensor). The motion detection may be performed based on an image obtained by the imaging unit 12.

The CPU 30 in the embodiment is configured by including a motion analysis unit 42 that calculates a variation amount (hereinafter referred to as "motion variation amount") in a direction of the motion of the electronic apparatus 300 within a certain period of time.

The determination unit 32 in the embodiment determines whether the user is in the non-operation state based on the motion variation amount calculated by the motion analysis unit 42.

For example, in a state where the electronic apparatus 300 is in a bag of the user while the power is turned on, a stuff in the bag may touch the operation unit 14 of the electronic apparatus 300. Further, for example, in a state where the electronic apparatus 300 is hung on a part of a body (for example, neck or shoulder) of the user while the power is turned on, the part of the body of the user may touch the operation unit 14 of the electronic apparatus 300 even in a case where there is no intention of operation. In these cases, in a case where it is determined whether the user is in the non-operation state based on an output signal of the operation unit 14, the user may be determined to be in the operation state even in the case of the non-operation state. The determination unit 32 of the embodiment determines that the user is in the non-operation state based on the motion variation amount calculated by the motion analysis unit 42 in a case where the variation amount in the motion direction within a certain period of time is larger than a threshold value (threshold value of motion variation amount) set in advance.

Figure 8:
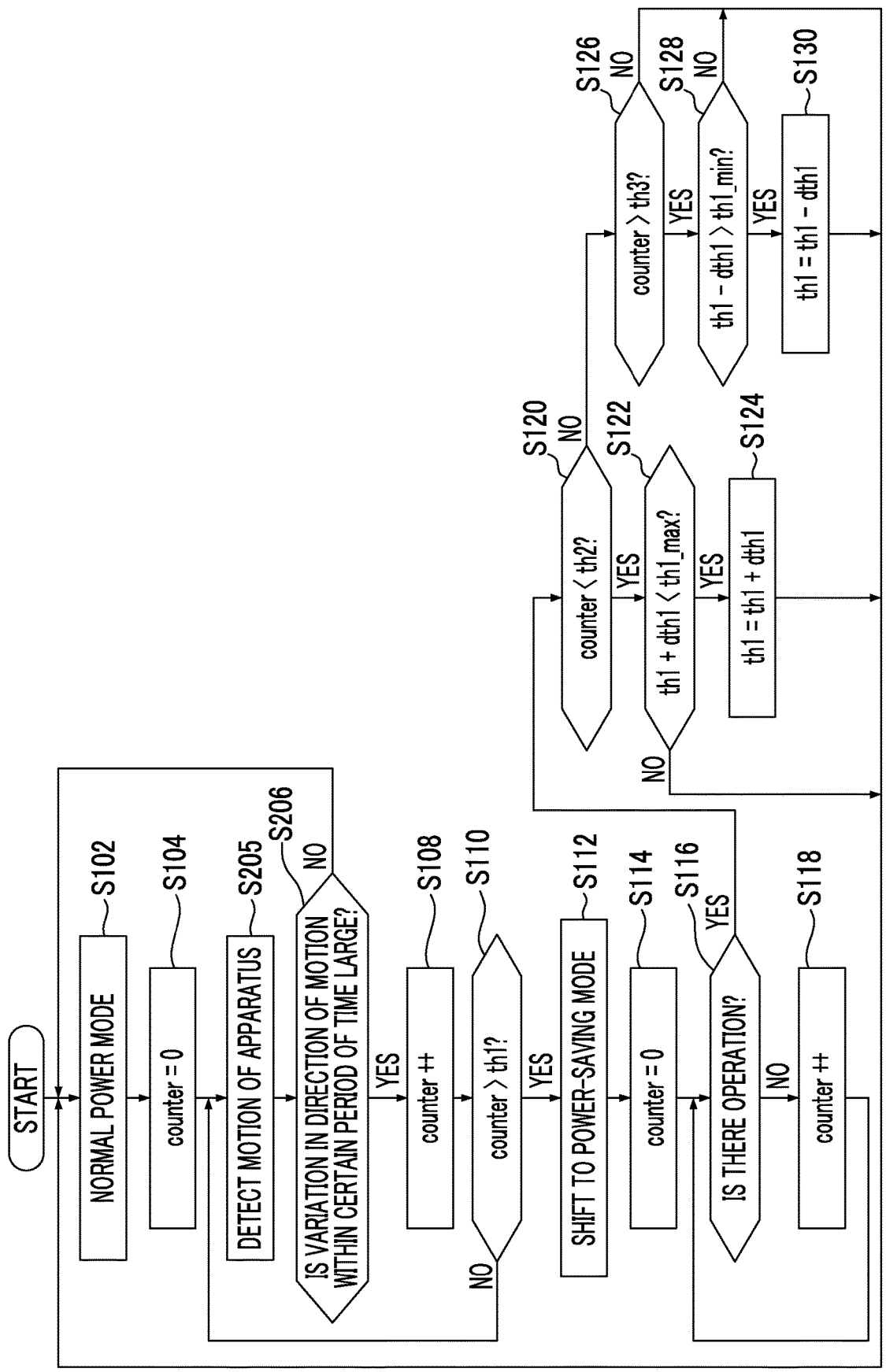
FIG. 8 is a flowchart showing a flow of an example of power-saving control processing in the third embodiment.

FIG. 8 is a flowchart showing a flow of an example of power-saving control processing in the third embodiment. The processing is executed by the CPU 30 (which is one form of computer) according to the program stored in the storage unit 28. The same reference numeral is assigned to the same step as that of the power-saving control processing example of the first embodiment shown in FIG. 2, and the contents already described are omitted below.

Steps S102 and S104 are the same as the power-saving control processing example in the first embodiment.

In step S205, the motion analysis unit 42 calculates the variation amount in the direction of the motion of the electronic apparatus 300 within a certain period of time.

In step S206, it is determined whether the variation amount in the direction of the motion of the electronic apparatus 300 within a certain period of time is large. The determination unit 32 of the example compares the motion variation amount calculated by the motion analysis unit 42 with the threshold value set in advance to determine whether the motion variation amount is larger than the threshold value. In a case where it is determined that the motion variation amount is large (YES in step S206), the value of the counter is updated (step S108) and it is determined whether the value of the counter exceeds the first threshold value th1 (step S110). That is, the determination unit 32 determines whether the non-operation state of the user continues for the reference time in the normal power mode (first power mode).

Steps S112 to S130 are the same as the power-saving control processing example of the first embodiment.

According to the embodiment, it is possible to surely shift the power mode to the power-saving mode even in the state where the electronic apparatus 300 is in the bag of the user while the power is turned on, or in the state where the electronic apparatus 300 is hung on a part of the body (for example, neck or shoulder) of the user while the power is turned on.

<Variation of Third Embodiment>

A variation in the third embodiment will be described.

Figure 9:
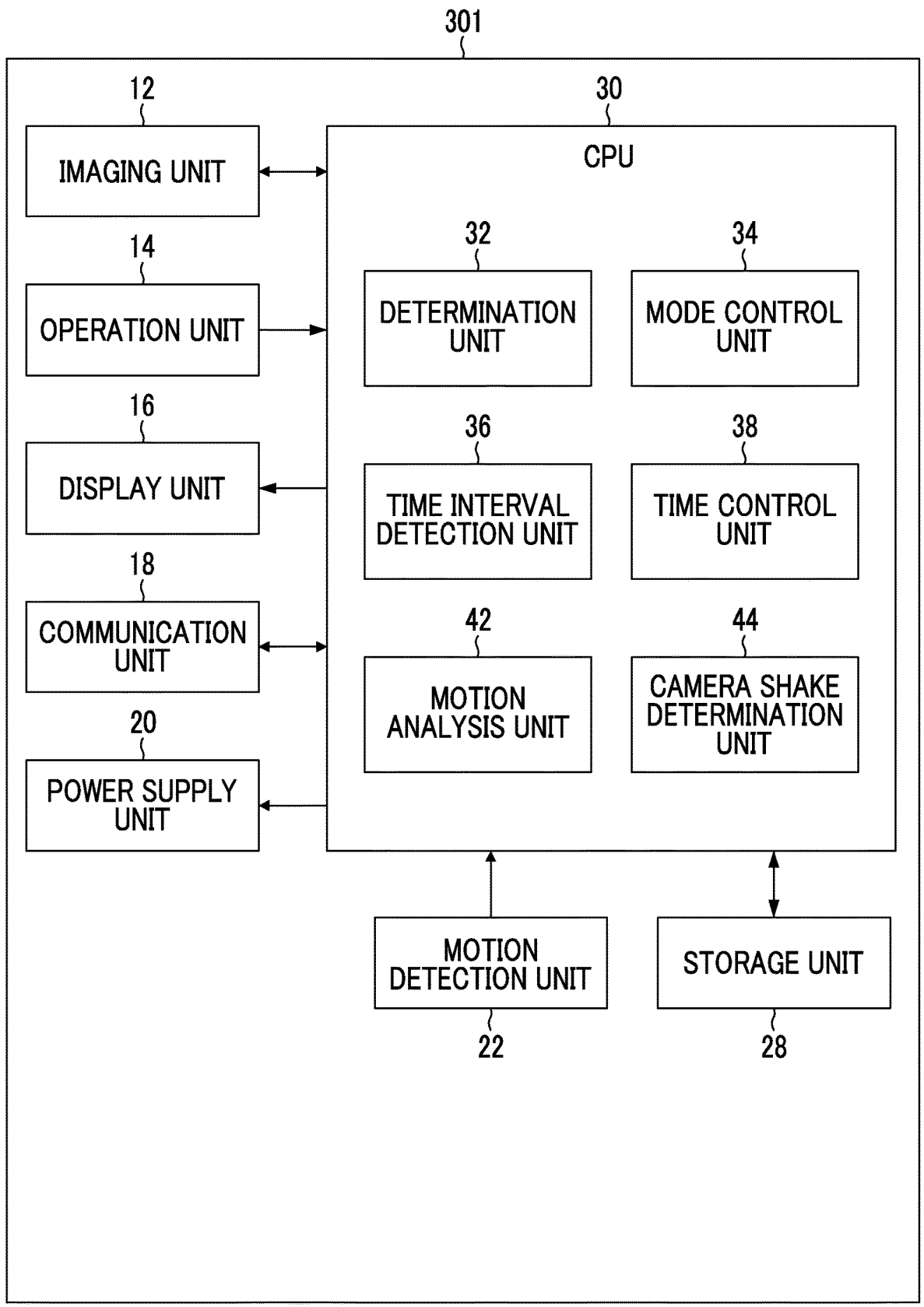
FIG. 9 is a block diagram showing a configuration example of an electronic apparatus of a variation in the third embodiment.

FIG. 9 is a block diagram showing a configuration example of an electronic apparatus 301 of the variation in the third embodiment. The same reference numeral is assigned to the same configuration element as that of the electronic apparatus 300 shown in FIG. 7, and the contents already described are omitted below.

The electronic apparatus 301 of the example comprises a camera shake determination unit 44 that determines whether the motion of the electronic apparatus 301 includes motion of a camera shake by the user. For example, it is determined whether the camera shake occurs for the motion of the electronic apparatus 301 detected by the motion detection unit 22 based on at least one of frequency or amplitude. The camera shake determination may be performed by using a sensor for camera shake detection (for example, vibration sensor).

The determination unit 32 of the example determines that the user is not in the non-operation state and is in the operation state where the action of the user corresponding to the operation is performed in a case where the camera shake determination unit 44 determines that the motion of the electronic apparatus 301 includes the motion of the camera shake even in a case where the motion variation amount calculated by the motion analysis unit 42 is larger than the threshold value. That is, the mode control unit 34 of the example maintains the normal power mode and does not execute the shift to the power-saving mode in the case where the camera shake determination unit 44 determines that the motion of the electronic apparatus 301 includes the motion of the camera shake.

Fourth Embodiment

Figure 10:
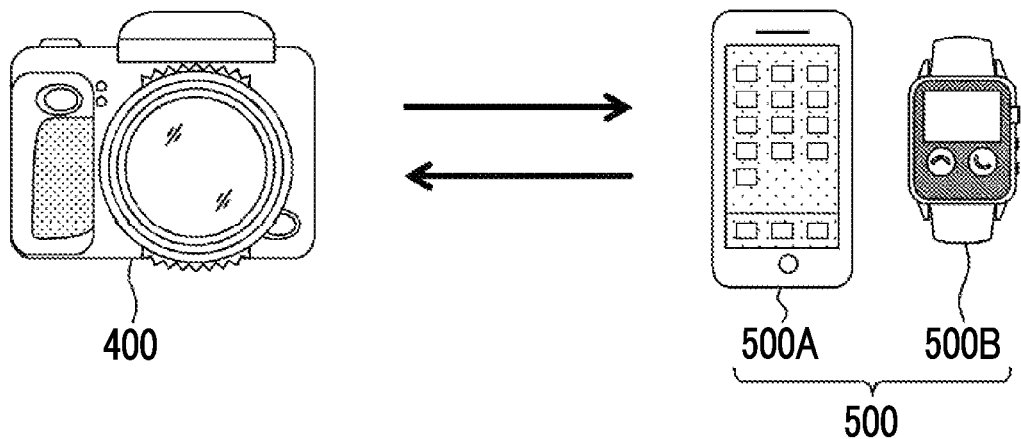
FIG. 10 is an explanatory diagram showing a first communication form in an electronic apparatus of a fourth embodiment.
Figure 11:
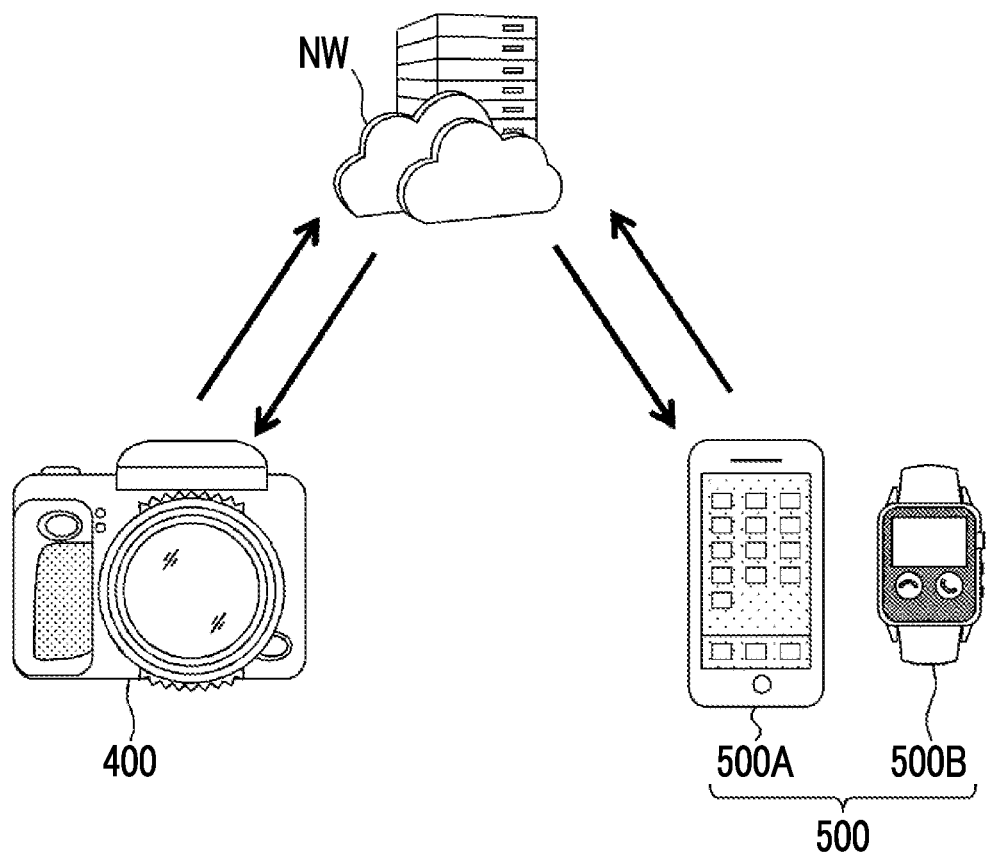
FIG. 11 is an explanatory diagram showing a second communication form in the electronic apparatus of the fourth embodiment.

FIG. 10 shows a first communication form in which the electronic apparatus 400 according to the embodiment directly communicates with external apparatuses 500 (first external apparatus 500A and second external apparatus 500B) used near the user. Further, FIG. 11 shows a second communication form in which the electronic apparatus 400 according to the embodiment communicates with the external apparatuses 500 used near the user through a network NW. It is possible to employ the electronic apparatus 400 of the embodiment in any communication form of the first communication form and the second communication form.

In FIGS. 10 and 11, the electronic apparatus 400 according to the embodiment is a digital camera. However, the electronic apparatus 400 according to the embodiment may be an electronic apparatus other than the digital camera.

Further, in FIGS. 10 and 11, the first external apparatus 500A is a so-called smartphone, and the second external apparatus 500B is a wearable terminal attached to the human body. It is possible to estimate that both the first external apparatus 500A and the second external apparatus 500B can be operated by the user and are inevitably present near the user in a state of communicating with the electronic apparatus 400.

Figure 12:
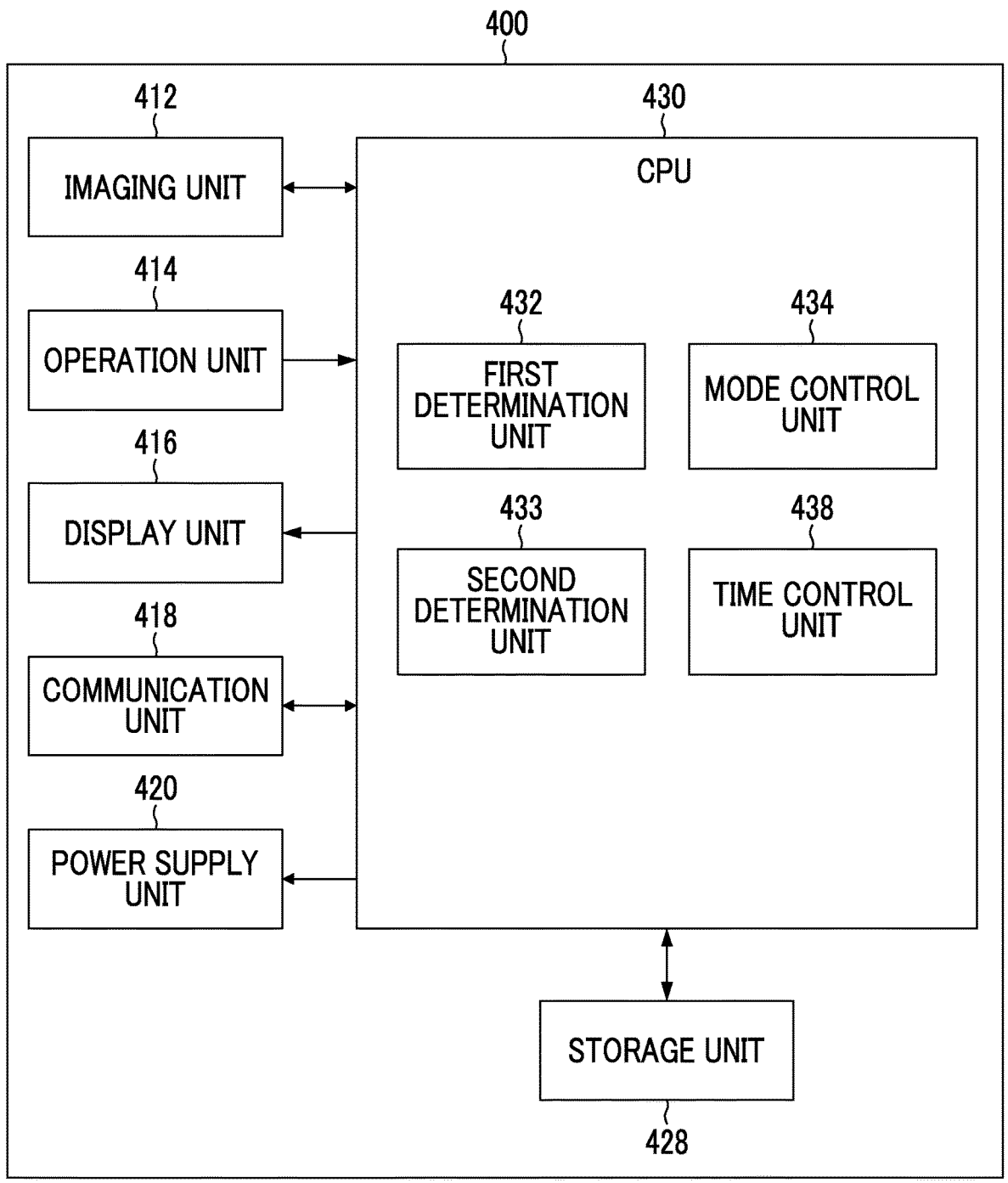
FIG. 12 is a block diagram showing a configuration example of the electronic apparatus of the fourth embodiment.

FIG. 12 is a block diagram showing a configuration example of the electronic apparatus 400 of the fourth embodiment.

The electronic apparatus 400 of the example is configured by including an imaging unit 412 that images the object, a communication unit 418 that communicates with the external apparatus 500, a power supply unit 420 that supplies the power to each unit of the electronic apparatus 400, a storage unit 428 that stores a program and information required for executing the program, and a central processing unit (CPU) 430 that executes the program.

The electronic apparatus 400 shown in FIG. 12 comprises an operation unit 414 capable of being operated by the user and a display unit 416 capable of displaying to the user, but the operation unit 414 and the display unit 416 can be omitted in the electronic apparatus 400 according to the embodiment. Further, the electronic apparatus 400 according to the embodiment may be configured by comprising another functional device (for example, sound input device) instead of the imaging unit 412 or together with the imaging unit 412.

The imaging unit 412 is configured by including the imaging optical system and the imaging element. The imaging unit 412 images the object under the control of the CPU 430. The operation unit 414 may be configured of, for example, the touch panel. The display unit 416 is configured of the display device such as the liquid crystal display device. The communication unit 418 may use, for example, the communication device that performs wireless communication or wire communication. The power supply unit 420 switches between the normal power mode (first power mode) and the power-saving mode (second power mode) in which the power is saved compared with the normal power mode under the control of the CPU 430. The storage unit 428 is configured of the non-transitory storage device such as the random access memory (RAM) and the transitory storage device such as the read only memory (ROM) and the electrically erasable programmable read only memory (EEPROM). The program is stored in the non-transitory storage device. The program may be stored in other non-transitory storage devices.

The CPU 430 comprises a first determination unit 432 that determines whether the electronic apparatus is far from or near the external apparatus 500 based on the communication with the external apparatus 500, a second determination unit 433 that determines whether a state far from the external apparatus 500 continues for the reference time in the normal power mode (first power mode), a mode control unit 434 that shifts the power mode from the normal power mode to the power-saving mode in which the power is saved compared with the normal power mode in a case where it is determined that the state far from the external apparatus 500 continues for the reference time in the normal power mode, and a time control unit 438 that changes the reference time used in the case where the normal power mode is shifted to the power-saving mode based on a time (hereinafter referred to as "non-operation time") for which the non-operation state continues in the normal power mode.

There are various types of farness determination forms in the first determination unit 432.

In a case where the communication unit 418 performs short-range communication with the external apparatus 500, the first determination unit 432 determines whether the electronic apparatus is far from or near the external apparatus 500 based on whether the communication unit 418 performs the short-range communication. Specifically, the first determination unit 432 determines whether there is a state where the communication unit 418 performs the short-range communication (hereinafter referred to as "short-range communication state"). The first determination unit 432 determines that the electronic apparatus 400 is close to the external apparatus 500 in a case of short-range communication state and the electronic apparatus 400 is far from the external apparatus 500 in a case of non-short-range communication state. Here, the "non-short-range communication state" means that the communication unit 418 is non-communication continuously for a certain period of time (for example, for 10 seconds), and it is preferable to determine as "short-range communication state" in a case where the communication unit 418 temporarily stops the communication (for example, for 5 seconds) and resumes the communication.

In a case where the communication unit 418 performs any of short-range or long-range communication with the external apparatus 500, the first determination unit 432 acquires distance information indicating a distance to the external apparatus 500 and determines whether the electronic apparatus is far from or near the external apparatus 500 based on the acquired distance information. Specifically, the first determination unit 432 extracts or recognizes information on the distance from communication contents of the communication unit 418 to acquire the distance information with respect to the external apparatus 500. The first determination unit 432 determines that the electronic apparatus 400 is close to the external apparatus 500 in a case where the distance information is less than a threshold value for farness determination and the electronic apparatus 400 is far from the external apparatus 500 in a case where the distance information is equal to or larger than the threshold value for farness determination. Here, the "threshold value for farness determination" is not particularly limited, but the threshold value indicates a distance (for example, 10 m) where it is sure that the electronic apparatus 400 is not in use by the user even while the user uses the external apparatus 500.

Further, in the example, the "power-saving mode" includes at least any state of the non-display state, the sleep state, the hibernation state, or the auto power-off state. However, the "power-saving mode" in the embodiment is not limited to the above-described states and may be a state in which the power is saved compared with the normal power mode.

FIG. 13 is a flowchart showing a flow of an example of power-saving control processing in the fourth embodiment in which the power-saving control method of the invention is employed. The processing is executed by the CPU 430 (which is one form of computer) according to the program stored in the storage unit 428.

First, the mode control unit 434 sets the power supply unit 420 to the normal power mode (step S402) and resets the value of the counter for counting a time (hereinafter referred to as "non-operation time") for which the non-operation state continues to zero (step S404).

In the normal power mode, the presence or absence of the user operation is determined (step S406). In the example, the presence or absence of the user operation with respect to the operation unit 414 is determined. Not only the user operation with respect to the operation unit 414 but also the action of the user corresponding to the operation may be determined that there is an operation. In a case where it is determined that there is no operation in the normal power mode (YES in step S406), it is further determined whether the power mode is the normal power mode (step S408). In a case where the power mode is the normal power mode, the processing proceeds to step S410.

In a case of the non-operation state in the normal power mode (YES in step S408), it is determined whether a distance to the external apparatus 500 is far based on the communication with the external apparatus 500 (step S410). That is, the first determination unit 432 determines whether the electronic apparatus is far from or near the external apparatus 500 based on the communication with the external apparatus 500.

In a case where it is determined that the distance from the external apparatus 500 is far (YES in step S410), the value of the counter is updated (step S412) and it is determined whether the value of the counter exceeds the first threshold value th1 (step S414). That is, the second determination unit 433 determines whether the state far from the external apparatus 500 continues for the reference time in the normal power mode.

In the normal power mode, in a case where the value of the counter exceeds the first threshold value th1 (YES in step S414), the mode control unit 434 sets the power supply unit 420 to the power-saving mode (step S416). That is, the mode control unit 434 shifts the power mode from the normal power mode to the power-saving mode.

According to the embodiment, the farness of the distance between the electronic apparatus 400 and the external apparatus 500 is determined based on at least any of the communication state and the communication contents between the electronic apparatus 400 and the external apparatus 500. In a case where the electronic apparatus 400 is at a distance surely far from the external apparatus 500, the power mode automatically shifts from the normal power mode to the power-saving mode. In a case where the electronic apparatus 400 is at a distance close to the external apparatus 500, the normal power mode is maintained. Accordingly, it is possible to realize both ease of use for the user and power-saving.

The embodiments for implementing the invention has been described. However, the invention is not limited to the embodiments and the modification examples described above, and various types of modifications are possible without departing from the gist of the invention.

EXPLANATION OF REFERENCES

11: eye detection unit
12: imaging unit
14: operation unit
16: display unit
18: communication unit 20: power supply unit
22: motion detection unit
24: attachment detection unit
28: storage unit
30: CPU
31: imaging estimation unit
32: determination unit
34: mode control unit
36: time interval detection unit
38: time control unit
42: motion analysis unit
44: camera shake determination unit
100, 101, 102, 200, 300, 301: electronic apparatus
236: time interval detection unit
238: time control unit
400: electronic apparatus
412: imaging unit
414: operation unit
416: display unit
418: communication unit
420: power supply unit
428: storage unit
430: CPU
432: first determination unit
433: second determination unit
434: mode control unit
438: time control unit
500: external apparatus
500A: first external apparatus
500B: second external apparatus
NW: network

What is claimed is:

1. An electronic apparatus comprising: a processor configured to implement:
   an operation unit operated by a user;
   a determination unit that determines whether a non-operation state of the user continues for a reference time in a first power mode;
   a mode control unit that shifts a power mode from the first power mode to a second power mode in which power is saved compared with the first power mode in a case where determination is made that the non-operation state continues for the reference time in the first power mode;
   a time interval detection unit that detects a maximum time interval of an operation of the operation unit by the user in the first power mode; and
   a time control unit that changes the reference time used in the case where the first power mode is shifted to the second power mode based on the maximum time interval detected in the first power mode.

2. The electronic apparatus according to claim 1 comprising:
   a motion analysis unit that calculates a variation amount in a direction of motion of the electronic apparatus within a certain period of time,
   wherein the determination unit determines whether the user is in the non-operation state based on the variation amount calculated by the motion analysis unit.

3. The electronic apparatus according to claim 2 comprising:
   a camera shake determination unit determines whether the motion of the electronic apparatus includes a motion of a camera shake by the user,
   wherein the mode control unit maintains the first power mode in a case where determination is made that the motion of the electronic apparatus includes the motion of the camera shake.

4. The electronic apparatus according to claim 1 comprising:
   an eye detection unit that detects an eye of the user,
   wherein the mode control unit maintains the first power mode in a case where the eye of the user is detected.

5. The electronic apparatus according to claim 2 comprising:
   an eye detection unit that detects an eye of the user,
   wherein the mode control unit maintains the first power mode in a case where the eye of the user is detected.

6. The electronic apparatus according to claim 3 comprising:
   an eye detection unit that detects an eye of the user,
   wherein the mode control unit maintains the first power mode in a case where the eye of the user is detected.

7. The electronic apparatus according to claim 1 comprising:
   an imaging unit that images an object;
   an imaging estimation unit that estimates whether the imaging starts,
   wherein the mode control unit maintains the first power mode in a case where the imaging is estimated to be started.

8. The electronic apparatus according to claim 2 comprising:
   an imaging unit that images an object;
   an imaging estimation unit that estimates whether the imaging starts,
   wherein the mode control unit maintains the first power mode in a case where the imaging is estimated to be started.

9. The electronic apparatus according to claim 3 comprising:
   an imaging unit that images an object;
   an imaging estimation unit that estimates whether the imaging starts,
   wherein the mode control unit maintains the first power mode in a case where the imaging is estimated to be started.

10. The electronic apparatus according to claim 4 comprising:
    an imaging unit that images an object;
    an imaging estimation unit that estimates whether the imaging starts,
    wherein the mode control unit maintains the first power mode in a case where the imaging is estimated to be started.

11. The electronic apparatus according to claim 1,
    wherein the mode control unit maintains the first power mode in a case where a specific operation set in advance is performed with respect to the operation unit.

12. The electronic apparatus according to claim 2,
    wherein the mode control unit maintains the first power mode in a case where a specific operation set in advance is performed with respect to the operation unit.

13. The electronic apparatus according to claim 3,
    wherein the mode control unit maintains the first power mode in a case where a specific operation set in advance is performed with respect to the operation unit.

14. The electronic apparatus according to claim 4,
    wherein the mode control unit maintains the first power mode in a case where a specific operation set in advance is performed with respect to the operation unit.

15. The electronic apparatus according to claim 7,
wherein the mode control unit maintains the first power mode in a case where a specific operation set in advance is performed with respect to the operation unit.

16. The electronic apparatus according to claim 1,
wherein the second power mode includes at least any state of a non-display state, a sleep state, a hibernation state, or an auto power-off state.

17. The electronic apparatus according to claim 1,
wherein the time control unit determines whether a value obtained by adding a constant value to the maximum time interval is larger than the reference time and updates the reference time to the value obtained by adding a constant value to the maximum time interval in a case where the value obtained by adding a constant value to the maximum time interval is larger than the reference time.

18. The electronic apparatus according to claim 1,
wherein the time control unit determines whether a value obtained by multiplying the time interval by a coefficient value is larger than the reference time and updates the reference time to the value obtained by multiplying the time interval by a coefficient value in a case where the value obtained by multiplying the time interval by a coefficient value is larger than the reference time.

19. A power-saving control method comprising:
a step of determining whether a non-operation state of a user continues for a reference time in a first power mode;
a step of shifting a power mode from the first power mode to a second power mode in which power is saved compared with the first power mode in a case where determination is made that the non-operation state continues for the reference time in the first power mode;
a step of detecting a maximum time interval of an operation by the user in the first power mode; and
a step of changing the reference time used in the case where the first power mode is shifted to the second power mode based on the maximum time interval detected in the first power mode.

20. A non-transitory computer readable recording medium storing a program causing a computer to execute:
a step of determining whether a non-operation state of a user continues for a reference time in a first power mode;
a step of shifting a power mode from the first power mode to a second power mode in which power is saved compared with the first power mode in a case where determination is made that the non-operation state continues for the reference time in the first power mode;
a step of detecting a maximum time interval of an operation by the user in the first power mode; and
a step of changing the reference time used in the case where the first power mode is shifted to the second power mode based on the maximum time interval detected in the first power mode.

* * * * *